June 11, 1968  L. CANAL  3,387,837
PROCESS AND DEVICE FOR MELTING ON MELTING SHELVES
Filed May 9, 1966                           2 Sheets-Sheet 1
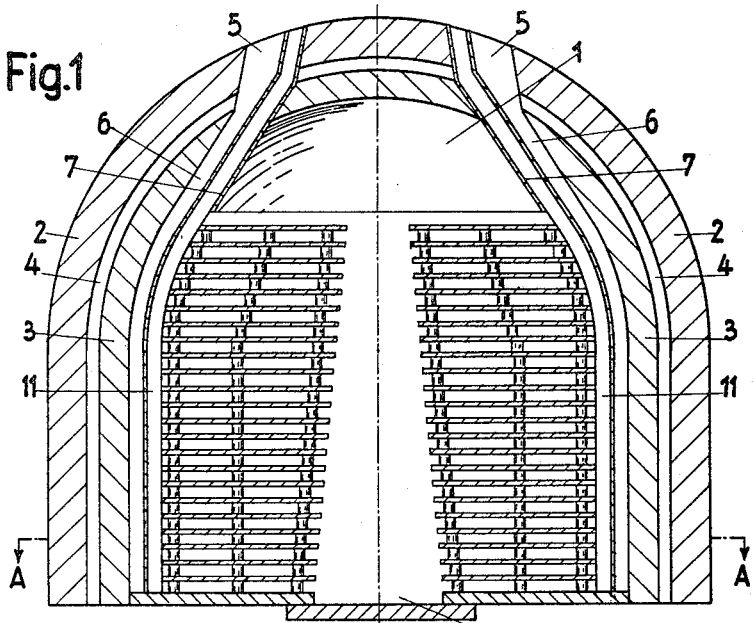
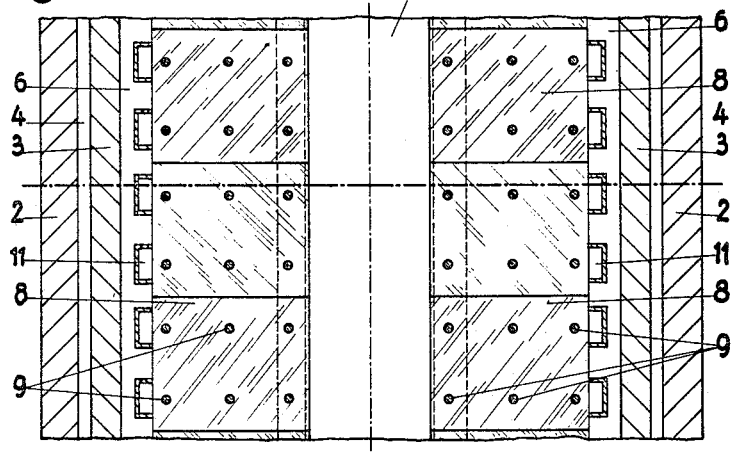

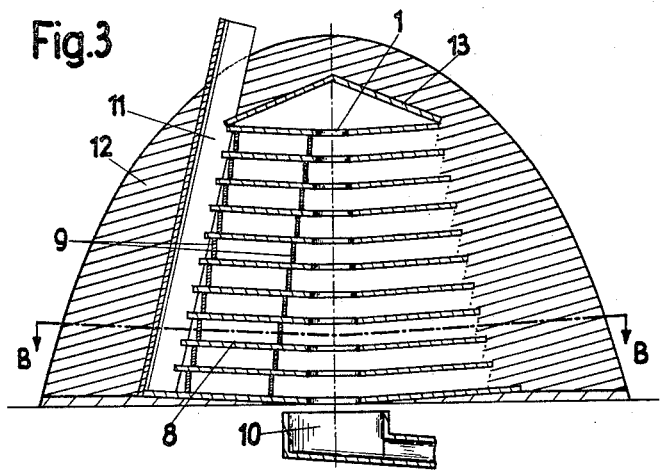
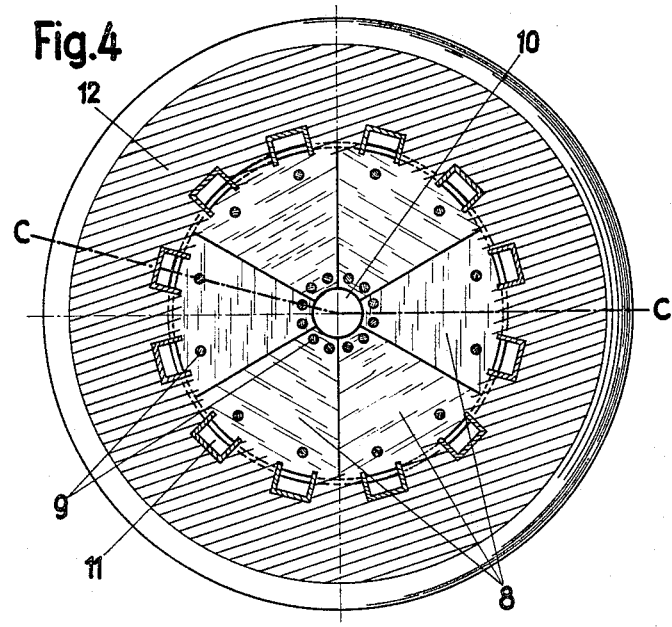

United States Patent Office 3,387,837
Patented June 11, 1968

3,387,837
PROCESS AND DEVICE FOR MELTING ON MELTING SHELVES
Ludwig Canal, 9 Christian-Plattner-Strasse, 6460 Imst, Tyrol, Austria
Filed May 9, 1966, Ser. No. 548,785
Claims priority, application Austria, May 11, 1965, A 4,258/65
11 Claims. (Cl. 263—30)

ABSTRACT OF THE DISCLOSURE

A process and device for continuously melting a free flowing material in which horizontally inclined shelves of a material unaffected by changes of temperature are arranged in spaced relation, and the material to be melted is fed to the shelves to cover the same to a depth related to their angle of slope. The shelves are heated, for example by hot gases which are passed between the latter, and the material is melted and simultaneously advances on the slightly inclined melting shelves and pass therefrom and is collected.

---

The invention relates to a process and device for melting a free-flowing material. Mixtures are mainly utilized of substances most of which have a melting point near the temperature to be obtained by the melting device, e.g. crushed clay, basalt, plastics, in so far as they are resistant to hot gases. Melts with a wide melting-range have usually been produced in tank-furnaces till now. Such discontinuously working melting devices must necessarily be utilized, if the melting product, e.g. glass, consists of different components.

In this invention a process is provided, where a free-flowing material is continuously poured on part of the circumference of melting shelves arranged in intervals one over another and the material is melted on the latter by thermal influence.

The material is poured on the melting shelves and flows thereon. The melting shelves may be surrounded by fire-proof walls, in which case the material is poured between the walls and the melting shelves. If no walls are provided the material is merely poured on the outer edge of the shelves. In both cases the material reaches the melting shelves, covering the latter to a depth according to its angle of slope.

The invention offers important economic advantages by the fact that the thermal influences is obtained by hot gases which are conducted over the melting shelves in reverse direction to that of the flowing material.

Owing to the principle of countercurrent flow the melting shelves as well as all surfaces of the material assume the temperature of the hot gases. Thus a rapid, regular melt is obtained. The material flowing on the shelves presses the melt on the melting shelves, said flow being improved by a slight downward inclination of the melting shelves from the side at which the material is poured.

During the flow, the melt is cleared: gases can escape and particles which are possibly not melted yet can be chemically dissolved in the melt.

It is of great advantage to maintain the distance between the different melting shelves by means of supports, where shorter melting shelves have as a result a lower output of material and therefore smaller slopes and smaller distances, the time of clearing depending on the material.

If, on the side the material is poured, the melting shelves are arranged in echelon, i.e. the lower melting shelves extend into the material poured and therefore are longer, the upper shelves are shorter and also the distances therebetween is less.

On the side of the melting shelves opposite to the material poured, the dropping melt is collected in a vat, which may be utilized as a discharge passage.

If there is a furnace chamber, the shape of the latter complies with the shape of the melting shelves. If the furnace chamber is rectangular, the melting shelves are favorably arranged on both sides of a discharge passage, the material being poured in the marginal zone. Here the melting shelves can be wedged between the front sides in order to avoid their dropping down when the shelves are numerous.

If the furnace chamber is circular, the melting shelves are concentric with a central discharge opening. Here the melting shelves form segments of a circle. Thus the different shelves support each other. This arrangement makes outside walls unnecessary, if the piles of melting shelves are wholly covered with material and the material is prevented by a cover from directly reaching the discharge opening.

The main advantage of the invention is the creation of a continuously working melting furnace for free-flowing material, the heat utilization being greatly improved and the output being increased.

An electrical heating of the melting shelves is possible. It is of particularly great advantage to conduct hot gases or flames through the intermediate spaces of the melting shelves arranged one over another. It is also of advantage to arrange a plurality of gas draft flues on the sides of the melting shelves where the material is poured, said draft flues having openings in communication with the melting shelves.

In the drawing, several embodiments of the invention are shown, wherein:

FIG. 1 is a longitudinal section through a furnace with a rectangular base.

FIG. 2 is a section taken through line AA in FIG. 1.

FIG. 3 shows another embodiment of the invention in vertical section taken along lines CC in FIG. 4.

FIG. 4 shows a horizontal section taken through lines BB in FIG. 3.

According to the embodiment shown in FIGS. 1 and 2, the furnace chamber 1 is surrounded by a brick wall 2 and a fire wall 3, an intermediate space 4 for cooling being provided between these walls. The furnace chamber 1 has a rectangular base. A supply opening 5 is provided in the ceiling zone, said supply opening extending the length of the furnace in the form of a slit. The opening 5 leads to a supply chamber 6 adjacent to the fire-wall 3. Towards the furnace chamber 1 the supply of the material to be melted is limited by the wall 7. The chamber is filled with free-flowing material, said material penetrating into the intermediate spaces provided between the melting shelves 8.

In the furnace chamber 1, melting shelves 8 arranged one over another are provided on both sides of the discharge passage 10, which is in the middle of the chamber and extends longitudinally. Said shelves consist of highly fire-proof material and are kept in spaced relation from one another by supports 9.

In the upper furnace zone, melting shelves 8, arranged in echelon, extend into the supply chamber 6 in order to facilitate the penetrating of the material into the intermediate spaces between the melting shelves 8. The melting shelves 8 terminate at the discharge passage 10 and are also arranged in echelon hereat. The supply chamber 6 is provided with a plurality of draft flues 11 for the heating gases which are lead away.

The material to be melted is poured into the furnace chamber 1 through the supply opening 5, flowing in between the furnace walls and the piles of melting shelves. The material reaches the different melting shelves and melts on the latter, flowing along until dropping into the discharge passage 10 at the end of the melting shelves 8.

The fire gases are centrally conducted into the furnace chamber 1 and, streaming between the melting shelves 8 towards the furnace walls, are diverted upwards through the draft flues 11.

In the embodiment shown in FIG. 3 and 4, the melting shelves 8 are segments of a circle, being concentric around the circular discharge opening 10. The diameters of the melting shelves 8 as well as the distances between the different shelves and therefore the length of the supports 9 diminish upwards. The inner furnace chamber 1 is limited at the top by the cover 13 and at the sides by the material 12. Draft flues are again provided for leading the gases away.

As mentioned above, the described embodiments of this invention can be varied. The gas draft flues can be differently arranged or can be omitted. The concentric arrangement of the melting shelves can also be realized in a walled chamber of circular cross-section, the melting shelves can be arranged in echelon or they can all have the same diameter; a grading along the whole height is also possible in a rectangular chamber. In all embodiments the melting shelves can be inclined inwards, as shown in FIG. 3, or they can be horizontal, as shown in FIG. 1.

The gas draft flues can be lengthened downwards, the hot gases being lead downwards in order to heat the discharge pipe. A wall chamber can be provided with a plane ceiling which may be detachable.

What I claim is:

1. A process for melting a free-flowing dried and crushed material comprising substantially simultaneously depositing the material in thin parallel, superposed layers on downwardly inclined slopes, heating the material on said slopes to melt the same whereby the material flows downwardly on said slopes, discharging the melted material from said slopes at a common location and collecting the melt material at said common location.

2. A process as claimed in claim 1 wherein said dried and crushed material is continuously fed in said streams and continuously withdrawn as melted material.

3. A process as claimed in claim 1 wherein said material on the slopes is heated by passing heated gases on said slopes in counter current with the material.

4. A process as claimed in claim 1 wherein said material is sieved natural clay or natural basalt.

5. Apparatus for melting a free-flowing material comprising a plurality of superposed included parallel spaced plates which are heat resistant, said plates being arranged to define a central passage at the lower inner ends of the plates, means for supplying the free-flowing material to the plates at the outer higher ends thereof substantially simultaneously whereby the material will flow on the plates towards the lower ends, means for supplying heat to the material as it passes on the plates to melt the material and enhance its downward flow, and means for collecting the thus melted material in said central passage for flow away from said plates.

6. Apparatus as claimed in claim 5 comprising support means between the plates for maintaining the same in their parallel, spaced relation.

7. Apparatus as claimed in claim 5 wherein the lower of the melting plates have outer ends which project beyond the outer ends of the upper plates.

8. Apparatus as claimed in claim 5 wherein said central passage increases in size from the top plates towards the lower plates.

9. Apparatus as claimed in claim 5 wherein said plates are rectangular in shape and are stacked in two spaced rows defining the central passage therebetween.

10. Apparatus as claimed in claim 5 wherein said plates have the shape of a segment of a circle and are stacked to define an annular configuration in which the central passage lies at the center of said configuration, said material being fed to the plates at the outer peripheries thereof.

11. Apparatus as claimed in claim 5 comprising a plurality of flues at the outer ends of the plates, said flues being in communication with the spaces between the plates whereby heat is supplied to the material by passage of a heating gas in countercurrent with the material on the plates and into the flues.

References Cited
UNITED STATES PATENTS

| | | | |
|---|---|---|---|
| 640,715 | 1/1900 | Stoveken | 263—30 |
| 979,921 | 12/1910 | Best | 263—30 |
| 1,551,424 | 8/1925 | Norrish | 263—30 |
| 2,780,310 | 2/1957 | Schaub | 34—171 X |
| 3,140,865 | 7/1964 | Cohen | 263—30 |
| 3,274,702 | 9/1966 | Kleinberg | 263—30 X |

JOHN J. CAMBY, *Acting Primary Examiner.*